US008718336B2

(12) United States Patent
Yamaguchi

(10) Patent No.: US 8,718,336 B2
(45) Date of Patent: May 6, 2014

(54) IMAGE CORRECTION APPARATUS, IMAGE CORRECTION METHOD, SKIN DIAGNOSIS METHOD, AND COMPUTER PROGRAM PRODUCT

(75) Inventor: Hiroshi Yamaguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1345 days.

(21) Appl. No.: 12/058,313

(22) Filed: Mar. 28, 2008

(65) Prior Publication Data

US 2008/0240606 A1 Oct. 2, 2008

(30) Foreign Application Priority Data

Mar. 30, 2007 (JP) .................................. 2007-092484
Mar. 5, 2008 (JP) .................................. 2008-054947

(51) Int. Cl.
*G06K 9/00* (2006.01)

(52) U.S. Cl.
USPC ........................................ 382/118; 382/165

(58) Field of Classification Search
USPC ......... 382/100, 115, 117, 118, 154, 162–167, 382/274; 348/222.1, 231.3; 345/600; 358/518–523
See application file for complete search history.

(56) References Cited

U.S. PATENT DOCUMENTS

| | | | | |
|---|---|---|---|---|
| 5,818,954 A | * | 10/1998 | Tomono et al. | 382/115 |
| 6,922,523 B2 | * | 7/2005 | Merola et al. | 396/14 |
| 7,119,855 B2 | * | 10/2006 | Fujiwara et al. | 348/705 |
| 7,330,286 B2 | * | 2/2008 | Fukasawa | 358/1.9 |
| 7,369,692 B2 | * | 5/2008 | Shirai et al. | 382/128 |
| 7,376,346 B2 | * | 5/2008 | Merola et al. | 396/14 |
| 7,683,944 B2 | * | 3/2010 | Horita | 348/234 |
| 8,025,408 B2 | * | 9/2011 | Sato et al. | 353/20 |
| 8,059,310 B2 | * | 11/2011 | Fukasawa | 358/1.9 |
| 2003/0076420 A1 | * | 4/2003 | Akiyama et al. | 348/207.1 |
| 2003/0138249 A1 | * | 7/2003 | Merola et al. | 396/661 |
| 2004/0027486 A1 | * | 2/2004 | Fujiwara et al. | 348/557 |
| 2004/0028263 A1 | * | 2/2004 | Sakamoto | 382/128 |
| 2004/0080634 A1 | * | 4/2004 | Sakamoto et al. | 348/241 |
| 2004/0081362 A1 | * | 4/2004 | Kuo | 382/254 |
| 2004/0257439 A1 | * | 12/2004 | Shirai et al. | 348/77 |

(Continued)

FOREIGN PATENT DOCUMENTS

| | | |
|---|---|---|
| JP | 7-323013 A | 12/1995 |
| JP | 2002-200050 A | 7/2002 |
| JP | 2003-274271 A | 9/2003 |

OTHER PUBLICATIONS

Japanese Office Action dated Oct. 25, 2011 for Japanese Application No. 2008-054947.

*Primary Examiner* — Chan Park
*Assistant Examiner* — Mia M Thomas
(74) *Attorney, Agent, or Firm* — Birch, Stewart, Kolasch & Birch, LLP

(57) ABSTRACT

An image correction technology for causing a person image to look more beautiful is provided. Provided is an image correction apparatus a partial region specifying section that specifies a partial region of a skin that satisfies a predetermined condition, within a first image captured under a first image capturing condition; a corresponding region specifying section that specifies a corresponding region that corresponds to the partial region within a second image captured under a second image capturing condition that is different from the first image capturing condition; and an image correction section that corrects the second image by performing predetermined image processing to the corresponding region of the second image.

18 Claims, 11 Drawing Sheets

(56) References Cited

U.S. PATENT DOCUMENTS

| | | |
|---|---|---|
| 2005/0201935 A1* | 9/2005 | Merola et al. .................. 424/9.1 |
| 2005/0271258 A1* | 12/2005 | Rowe ............................ 382/124 |
| 2005/0271295 A1* | 12/2005 | Tabata et al. .................. 382/274 |
| 2006/0078218 A1* | 4/2006 | Igarashi ........................ 382/255 |
| 2006/0078224 A1* | 4/2006 | Hirosawa ...................... 382/284 |
| 2006/0274936 A1* | 12/2006 | Ohkubo et al. ............... 382/167 |
| 2007/0104472 A1* | 5/2007 | Quan et al. ...................... 396/79 |
| 2008/0240606 A1* | 10/2008 | Yamaguchi ................... 382/274 |
| 2009/0201365 A1* | 8/2009 | Fukuoka et al. ................ 348/77 |
| 2011/0208258 A1* | 8/2011 | Rasnetsov et al. ................ 607/3 |

* cited by examiner

IMAGE CORRECTION APPARATUS, IMAGE CORRECTION METHOD, SKIN DIAGNOSIS METHOD, AND COMPUTER PROGRAM PRODUCT

CROSS REFERENCE TO RELATED APPLICATION

The present application claims priority from Japanese Patent Applications No. 2007-092484 filed on Mar. 30, 2007, and No. 2008-54947 filed on Mar. 5, 2008, the contents of which are incorporated herein by reference.

BACKGROUND

1. Technical Field

The present invention relates to an image correction apparatus, an image correction method, a skin diagnosis method, and a computer program product. In particular, the present invention relates to an image correction apparatus, an image correction method, a skin diagnosis method, and a computer program product, which enable a skin of a person in a captured image to be corrected to look beautiful, and are for use in skin diagnosis.

2. Description of the Related Art

It is known that, when linear polarized light is reflected on a surface of an object, the polarization direction of the irradiated light will be maintained. In addition, when irradiated light enters inside an object before being reflected off, it is known that the polarization direction rotates according to the progression of the light inside the object thereby causing the resulting reflected light to have a different polarization direction from the polarization direction of the irradiated light. By making use of this light reflection characteristic in capturing an image of a person, it becomes possible to perform image capturing by emphasizing the state of the skin of the person.

For example, Japanese Patent Application Publication No. 7-323013 discloses a skin surface observation apparatus for observing a skin surface, by causing S-polarized light and P-polarized light to be incident onto a skin independently from each other, and by receiving S-polarization component and P-polarization component included in light reflected from the skin in response to each incident light. Moreover, Japanese Patent Application Publication No. 2002-200050 discloses a skin color measuring apparatus for measuring a color such as a melanin component using the internal reflected light from which the surface reflected light is excluded by making use of the polarization.

SUMMARY

However, the existing technologies only relate to application of polarization or the like for observing the state of the skin of a person. In the field of capturing an image of a person, a technology for image correction for causing the person image to look more beautiful is desired.

Therefore, it is an object of an aspect of the innovations herein to provide an image correction apparatus that includes: a partial region specifying section that specifies a partial region of a skin that satisfies a predetermined condition, within a first image captured under a first image capturing condition; a corresponding region specifying section that specifies a corresponding region that corresponds to the partial region within a second image captured under a second image capturing condition that is different from the first image capturing condition; and an image correction section that corrects the second image by performing predetermined image processing to the corresponding region of the second image.

The summary of the invention does not necessarily describe all necessary features of the present invention. The present invention may also be a sub-combination of the features described above.

According to the innovations herein, it becomes possible to specify a partial region of a skin that satisfies a predetermined condition, and to provide image processing to a region corresponding to the partial region. As a result, it becomes possible to obtain a correction image resulting from correcting a person image to look more beautiful.

DESCRIPTION OF EXEMPLARY EMBODIMENTS

The invention will now be described based on the preferred embodiments, which do not intend to limit the scope of the present invention, but exemplify the invention. All of the features and the combinations thereof described in the embodiment are not necessarily essential to the invention.

Figure 1:
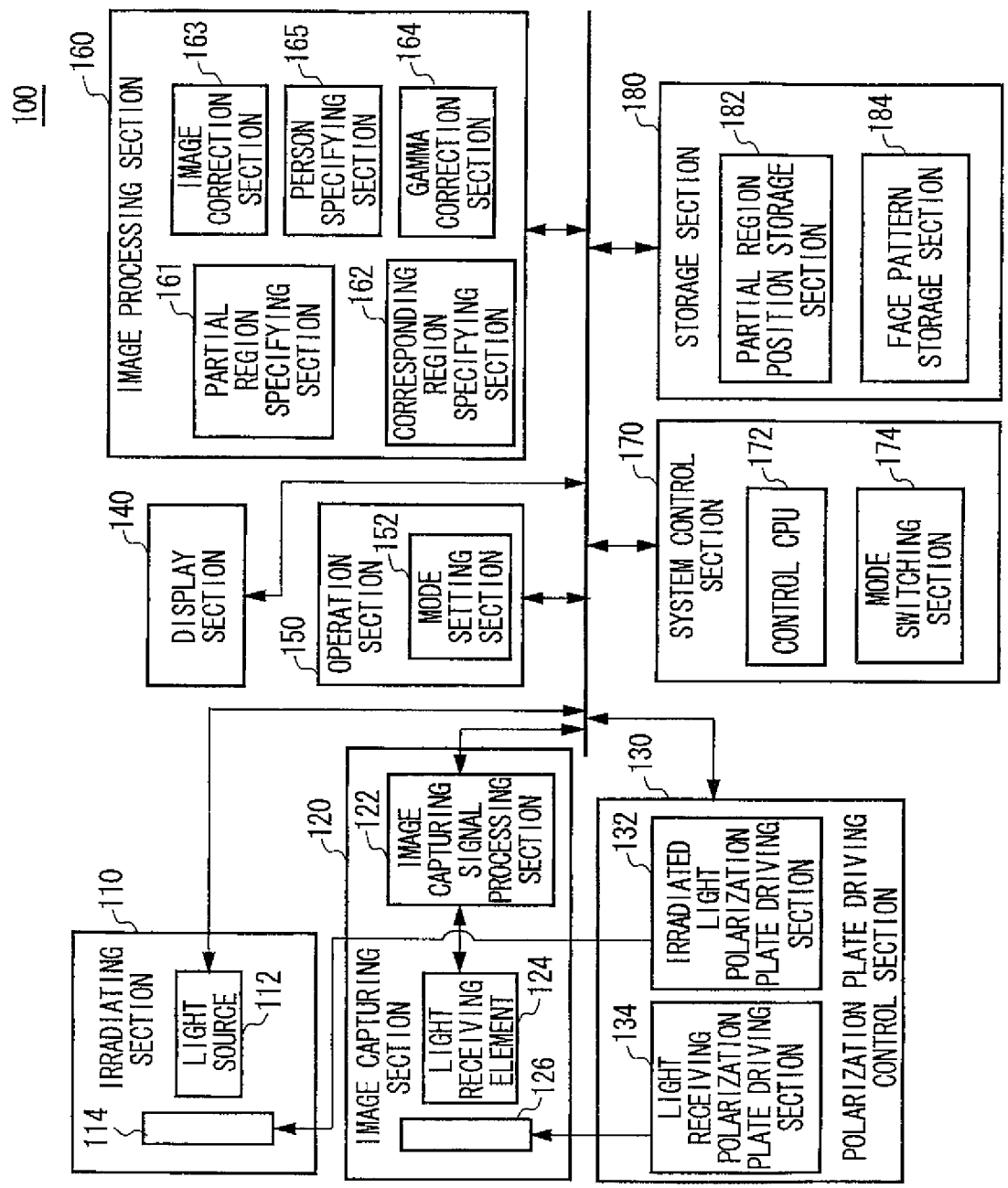
FIG. 1 shows one example of an image capturing apparatus 100 according to the present embodiment.

FIG. 1 shows one example of an image capturing apparatus 100 according to the present embodiment. The image capturing apparatus 100 according to the present embodiment includes an irradiating section 110, an image capturing section 120, a polarization plate driving control section 130, a display section 140, an operation section 150, an image processing section 160, a system control section 170, and a storage section 180. Note that the image capturing apparatus 100 is one example of an image correction apparatus. The image correction apparatus recited in the claims may be, alternative to the image capturing apparatus 100, a personal computer, or a server connected to a communication network such as the Internet.

The irradiating section 110 includes a light source 112 and an irradiated light polarization plate 114. The light source 112 may be a so-called flash lamp, and emits light for irradiating a subject. Light emitted from the light source 112 includes a polarization component in an arbitrary direction, and the irradiated light polarization plate 114 transmits only polarized light in a specific direction. Light emitted from the irradiating section 110 becomes linear polarized light that solely includes a polarization component in a specific direction by being transmitted through the irradiated light polarization plate 114.

Note that the irradiated light polarization plate 114 may be rotated or excluded from a light path by means of a later explained polarization plate driving section. If the polarization direction of the irradiated light polarization plate 114 is rotated, the linear polarized light of the light emitted from the irradiating section 110 is rotated in accordance with the rotation. If the irradiated light polarization plate 114 is excluded from the light path, the light emitted from the irradiating section 110 will become circular polarized light instead of linear polarized light that includes an arbitrary polarized light component.

The image capturing section 120 includes an image capturing signal processing section 122, a light receiving element 124, and a received light polarization plate 126. The image capturing signal processing section 122 performs A/D conversion to an analogue output of the light receiving element 124, thereby obtaining brightness data of 8 bits for example. When the analogue output of the light receiving element 124 is subjected to color separation into RGB components, the brightness data of 8 bits is obtained for each of the RGB components.

In addition, the image capturing signal processing section 122 is able to obtain white balance by adjusting each of the RGB components. The image capturing signal processing section 122 interfaces the system control section 170 and so on. The light receiving element 124 converts incident light into an electric signal (i.e. analogue value). A representative example of the light receiving element 124 is a CCD (charge-coupled device).

The received light polarization plate 126 transmits polarized light in a specific direction, just as the irradiated light polarization plate 114. The reflected light of the polarization component that matches the polarization direction of the received light polarization plate 126, from among the light reflected by a subject, is transmitted through the received light polarization plate 126 to reach the light receiving element 124. Note that the received light polarization plate 126 may be rotated or excluded from the light path by means of the polarization plate driving section described later. When the received light polarization plate 126 is rotated, the polarization direction of the transmitted light will be rotated according to the rotation. When the received light polarization plate 126 is excluded from the light path, the entire polarization components of the light reflected by the subject will reach the light receiving element 124.

The polarization plate driving control section 130 includes an irradiated light polarization plate driving section 132 and a received light polarization plate driving section 134. The irradiated light polarization plate driving section 132 drives the irradiated light polarization plate 114, either to rotate or to be excluded from a light path. The received light polarization plate driving section 134 drives the received light polarization plate 126, either to rotate or to be excluded from a light path. The polarization plate driving control section 130 controls the irradiated light polarization plate driving section 132 and the received light polarization plate driving section 134, in response to control from the system control section 170.

For example, the display section 140 includes a liquid crystal display panel and a panel driver, and displays an image captured by the image capturing apparatus 100. The operation section 150 includes a power supply switch, a release switch, a zoom button or a function setting button, and the like for example. In particular, the operation section 150 includes a mode setting section 152 for setting in which one of a beautiful skin mode and a normal mode the image capturing is to be performed, where the beautiful skin mode is enabled by the image capturing apparatus 100.

The image processing section 160 corrects a correction target image so that the subject looks beautiful, by processing the images captured under a variety of conditions described above either alone or in combination. The image processing section 160 includes a partial region specifying section 161, a corresponding region specifying section 162, an image correction section 163, a gamma correction section 164, and a person specifying section 165.

The partial region specifying section 161 specifies a wrinkle partial region from a wrinkle partial region specifying image described above. In addition, the partial region specifying section 161 specifies a spot partial region from a spot partial region specifying image described above. In the present application, a "spot" indicates a blemish, a speckle, or the like of a face. Specifying of a wrinkle partial region or a spot partial region is performed by specifying a skin region and by specifying a series of pixels that experiences largest change in brightness within the skill region, for example.

When this series of pixels constitutes a closed region and that the brightness within the closed region is lower than its surrounding region, the closed region has a high possibility of being a spot region. On the contrary, when this series of pixels is open linearly where a plurality of pixels align parallel to each other, the region has a high possibility of being a wrinkle region. By processing the brightness data of each pixel under the above assumption, it is possible to specify a wrinkle partial region or a spot partial region.

The corresponding region specifying section 162 specifies a region corresponding to a wrinkle partial region or a region corresponding to a spot partial region, in the correction target image described above. When a wrinkle partial region specifying image or a spot partial region specifying image is captured chronologically adjacent to a correction target image, and that the composition of the subject is substantially the same among these images, it is possible to specify a corresponding region by specifying the pixel of the correction target image that corresponds to the pixel of the wrinkle partial region or the spot partial region. When the subject composition of the wrinkle partial region specifying image or the spot partial region specifying image does not match the subject composition of the correction target image, the characteristic point such as eyes, eyebrows, and a mouth is extracted by analyzing the face image of a person in the subject composition, for example. Then by standardizing the position of the wrinkle partial region or the spot partial region by using a relative distance from the characteristic point, the position thereof in the correction target image is able to be specified as a corresponding region.

The image correction section 163 performs image correction to a corresponding region in the correction target image, which corresponds to a wrinkle partial region or a spot partial region. By this image correction, the wrinkle or the spot existing in the corresponding region of the correction target image can be made to be less noticeable. The correction of a wrinkle or a spot may be performed by replacing the brightness of the pixel within the corresponding region, with the average brightness of the surrounding pixels of the corresponding region.

So as to perform more natural correction, it is also possible to extract the space frequency of the brightness change for each pixel, and to cut the high frequency region of the space frequency and interpolate the brightness between pixels for the low frequency region of the space frequency. When the high frequency region of the space frequency represents a lentigo for example, the high frequency region may be retained. Note that it is possible to apply an existing arbitrary image correction method as the image correction method.

The gamma correction section 164 alters the brightness data for each pixel, by applying a predetermined gamma curve to a wrinkle partial region specifying image, a spot partial region specifying image, and a correction target image. Here, the gamma correction is an input/output conversion operation whereby the brightness data for each pixel before correction is converted into a value after correction in accordance with a gamma curve, where the gamma curve is such that its output value is determined according to its input value. The gamma curve is defined as a conversion curve representing an output value corresponding to an input value. That is, the gamma correction finds an output value by using the gamma curve, with the brightness data of a certain pixel as an input value. Then the operation of finding the output value as brightness data after correction is performed for all the pixels.

The gamma correction makes it possible to change the non-linear input/output characteristic of an image input/output device into a linear formation, and to enhance the contrast in the brightness region in which a certain image is desired to be emphasized in particular. Note that when the brightness data has been color-separated into each of the RGB components, it is possible to perform gamma correction to the brightness data of each of the RGB components.

In the gamma correction performed by the gamma correction section 164, the gamma curve applied to a wrinkle partial region specifying image and a spot partial region specifying image is different from the gamma curve applied to a correction target image. In addition, the gradient in the skin brightness range of the gamma curve applied to a wrinkle partial region specifying image and a spot partial region specifying image is larger than the gradient in the skin brightness range of the gamma curve applied to a correction target image. By enlarging the gradient of the gamma curve applied to a wrinkle partial region specifying image and a spot partial region specifying image, the brightness difference in the skin brightness range will appear more clearly, and so it becomes easier to specify the wrinkle partial region and the spot partial region.

Note that the skin brightness range can be determined by specifying a skin region from a wrinkle partial region specifying image and a spot partial region specifying image that have been captured in advance, and by setting the maximum brightness and the minimum brightness of each pixel within the skin region as the upper limit and the lower limit of the skin brightness range. Then the gamma curve is defined so that the gradient within the skin brightness region will be the maximum. When the brightness data is color-separated into each of the RGB components, the gradient of the gamma curve within the skin brightness range can be enlarged for each color component. In observing a spot whose absorption band has a high possibility of residing in the blue-type color, the spot has a high possibility of being observed as a change the B-component brightness. Therefore, the gamma correction can be applied to such a case by particularly enlarging the gamma curve gradient of the B-component.

The person specifying section 165 specifies a person included in a correction target image. The person specifying section 165 calculates a face pattern by extracting the characteristic point such as eyes, eyebrows, a nose, and a mouth from the face image of the person, for example. Then, a matching face pattern is retrieved by accessing the face pattern storage section of the storage section 180 detailed later. When a matching face pattern is retrieved, the person is specified according to the matching face pattern.

The system control section 170 controls the entirety of the image capturing apparatus 100. The system control section 170 includes a control CPU 172 and a mode switching section 174. The control CPU 172 executes an operation required for system control. The mode switching section 174 switches between a beautiful skin image capturing mode and a normal image capturing mode. In the beautiful skin image capturing mode, a variety of control peculiar to the beautiful mode is performed such as the driving control directed to the irradiated light polarization plate 114 and the received light polarization plate 126, acquiring and recording of the wrinkle partial region specifying image, the spot partial region specifying image, and the correction target image, specifying of the wrinkle partial region and the spot partial region, and the gamma correction and the image correction, which are described above.

The storage section 180 stores a variety of data for use in the image capturing apparatus 100. The storage section 180 includes a partial region position storage section 182 and a face pattern storage section 184. The partial region position storage section 182 stores, in association with person identification information such as a name, the position of a wrinkle partial region or a spot partial region of the person. The face pattern storage section 184 stores a face pattern of the person in association with the person identification information such as a name. As described above, a face pattern is used for specifying a person.

Figure 2:
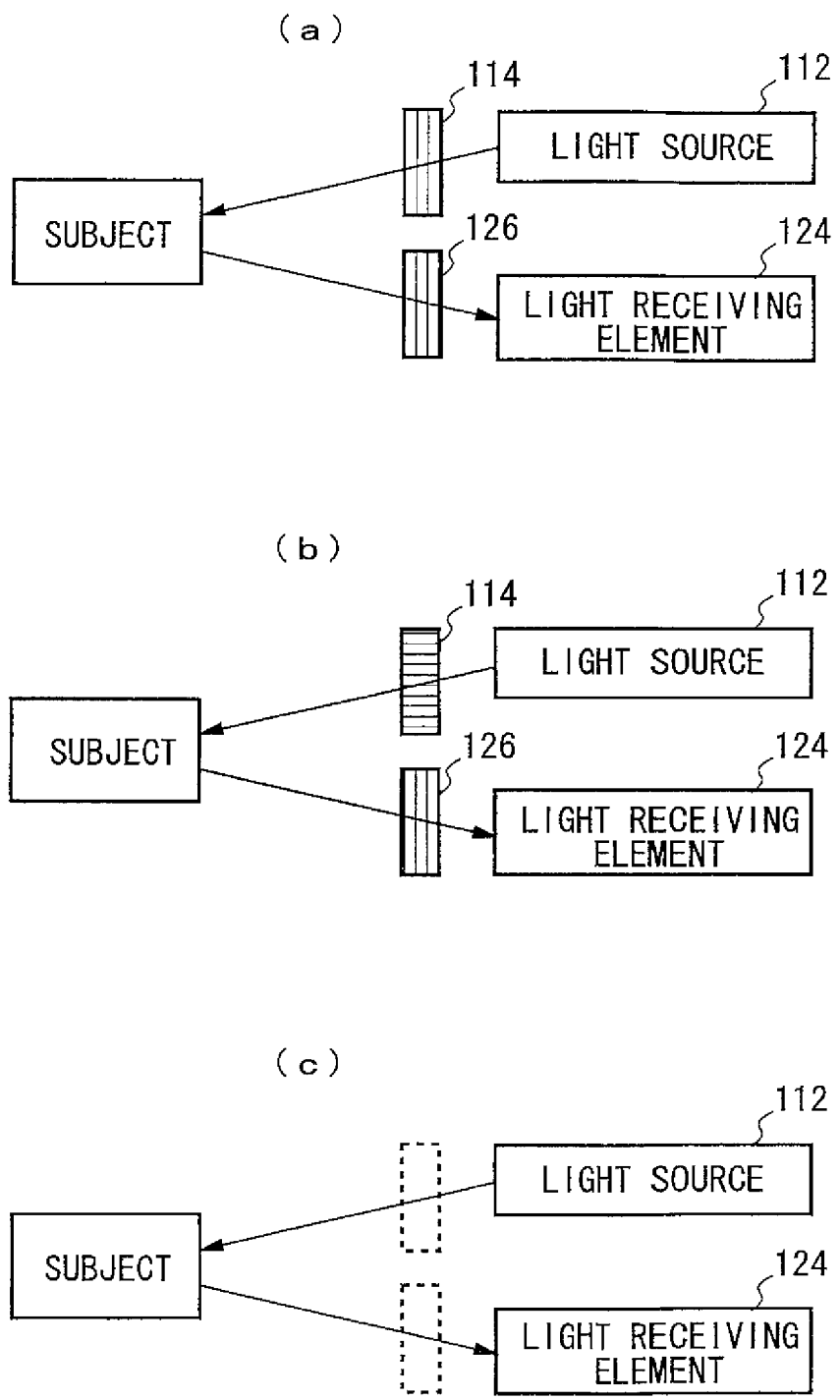
FIG. 2A, FIG. 2B, and FIG. 2C show a combination of rotation and exclusion from the light path, with respect to the irradiated light polarization plate 114 and the received light polarization plate 126.

FIG. 2A, FIG. 2B, and FIG. 2C show a combination of rotation and exclusion from the light path, with respect to the irradiated light polarization plate 114 and the received light polarization plate 126. FIG. 2A shows a case where the polarization direction of the received light polarization plate 126 is set as the same direction as the polarization direction of the irradiated light polarization plate 114. FIG. 2B shows a case where the polarization direction of the received light polarization plate 126 is set as the vertical direction to the polarization direction of the irradiated light polarization plate 114. FIG. 2C shows a case where the irradiated light polarization plate 114 and the received light polarization plate 126 are excluded from the light path. By a combination of rotation and exclusion from the light path, with respect to the irradiated light polarization plate 114 and the received light polarization plate 126, such as shown in FIG. 2A, FIG. 2B, and FIG. 2C, it becomes possible to separate, among the reflected light from the subject, the light component reflected at the surface of the subject from the light component reflected after entering inside the subject.

To be more specific, the nature of reflected light that the polarization direction of light reflected at the surface of a subject is maintained while the polarization direction of light having entered inside a subject changes. That is, by setting the polarization direction of the received light polarization plate 126 as substantially the same direction as the polarization direction of the irradiated light polarization plate 114 (the example of FIG. 2A), the light reflected at the surface of the subject will be the principle light of the light incident to the light receiving element 124. Conversely, by setting the polarization direction of the received light polarization plate 126 as substantially the vertical direction to the polarization direction of the irradiated light polarization plate 114 (the example of FIG. 2B), the light reflected after entering inside the subject will be principle light of the light incident to the light receiving element 124. By performing image capturing using the light reflected at the surface of the subject, the wrinkle of the skin surface will be emphasized for example, and by performing image capturing using the light reflected after entering inside the subject, the spot inside the skin will be emphasized for example.

The image captured by emphasizing the wrinkle at the skin surface or the spot inside the skin as described above will be employed for image correction. To be more specific, the image captured under the condition that the polarization direction matches between the irradiated light polarization plate 114 and the received light polarization plate 126 (i.e. image where the skin surface is emphasized) can be used as a wrinkle partial region specifying image. Meanwhile, the image captured under the condition that the polarization direction of the received light polarization plate 126 is vertical to the polarization direction of the irradiated light polarization plate 114 (i.e. image where inside the skin is emphasized) can be used as a spot partial region specifying image. When either or both of the irradiated light polarization plate 114 and the received light polarization plate 126 is (are) excluded from the light path (the example of FIG. 2C), the light that includes an arbitrary polarization direction which is the same as the reflected light from the subject will be incident onto the light receiving element 124. The image captured under the stated condition can be used as a correction target image.

Figure 3:
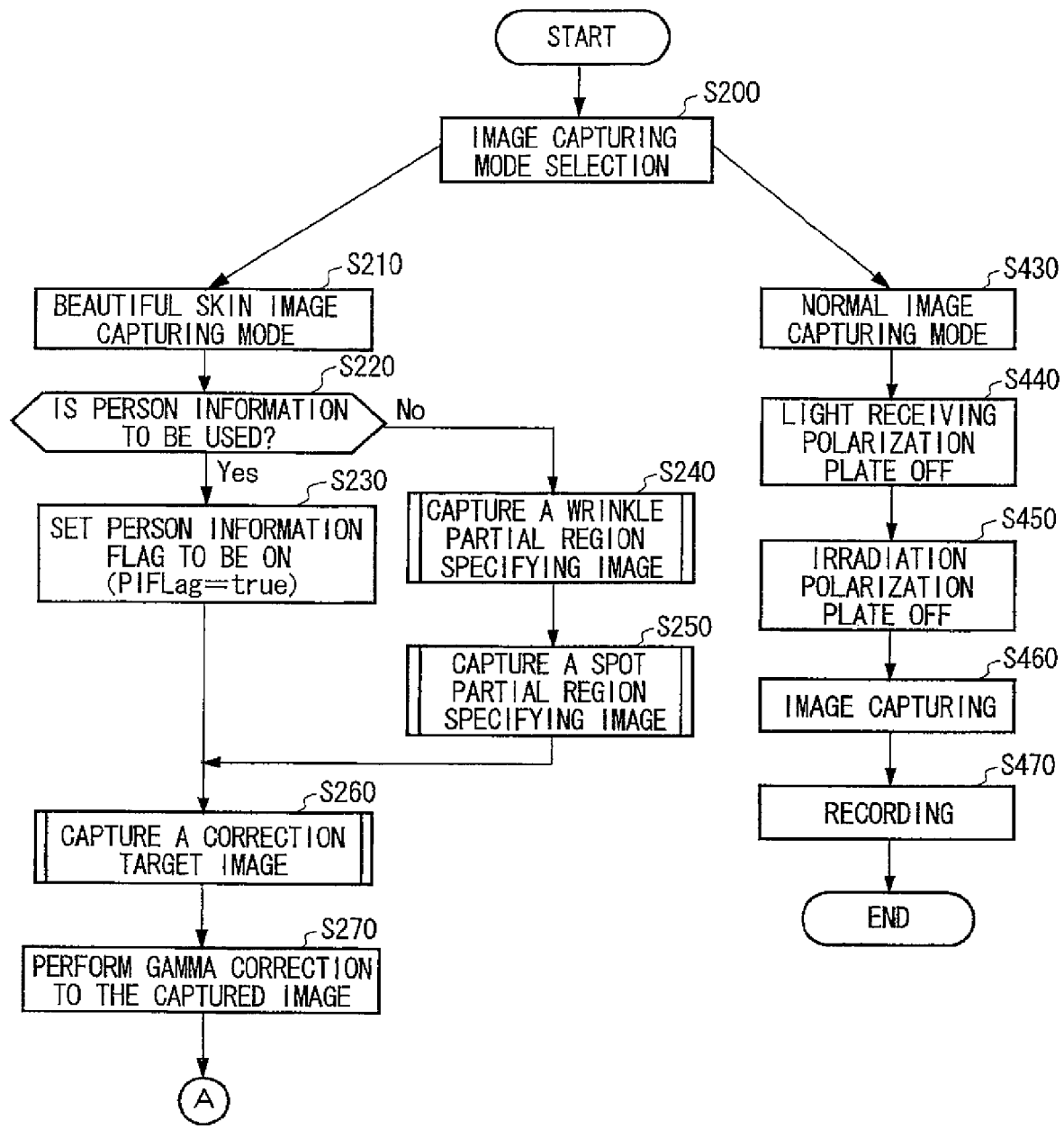
FIG. 3 shows one example of an image capturing method according to the present embodiment.

FIG. 3 shows the first half of an image capturing method according to the present embodiment. Note that the image capturing method in the present embodiment is one example of an image correction method. First, when the process starts, the image capturing mode is selected (S200). When the beautiful skin mode is selected, the control proceeds to Step S210, and when the normal image capturing mode is selected, the control proceeds to Step S430. The case where the normal image capturing mode is selected is described later.

In the beautiful skin mode (S210), whether to use person information is determined first (S220). When the person information is used, a person information flag PIFlag is set ON (i.e. setting the PIFlag to "true") (S230), and the control proceeds to Step S260. In Step S220, when the person information is determined not to be used, a wrinkle partial region specifying image is captured (S240). After this, a spot partial region specifying image is captured (S250), and the control proceeds to Step S260.

In Step S260, a correction target image is captured (S260). Next, gamma correction is performed to the wrinkle partial region specifying image, the spot partial region specifying image, and the correction target image, which have been captured (S270). Note that when a wrinkle partial region specifying image and a spot partial region specifying image have not been captured, gamma correction is performed to a captured correction target image.

Figure 4:
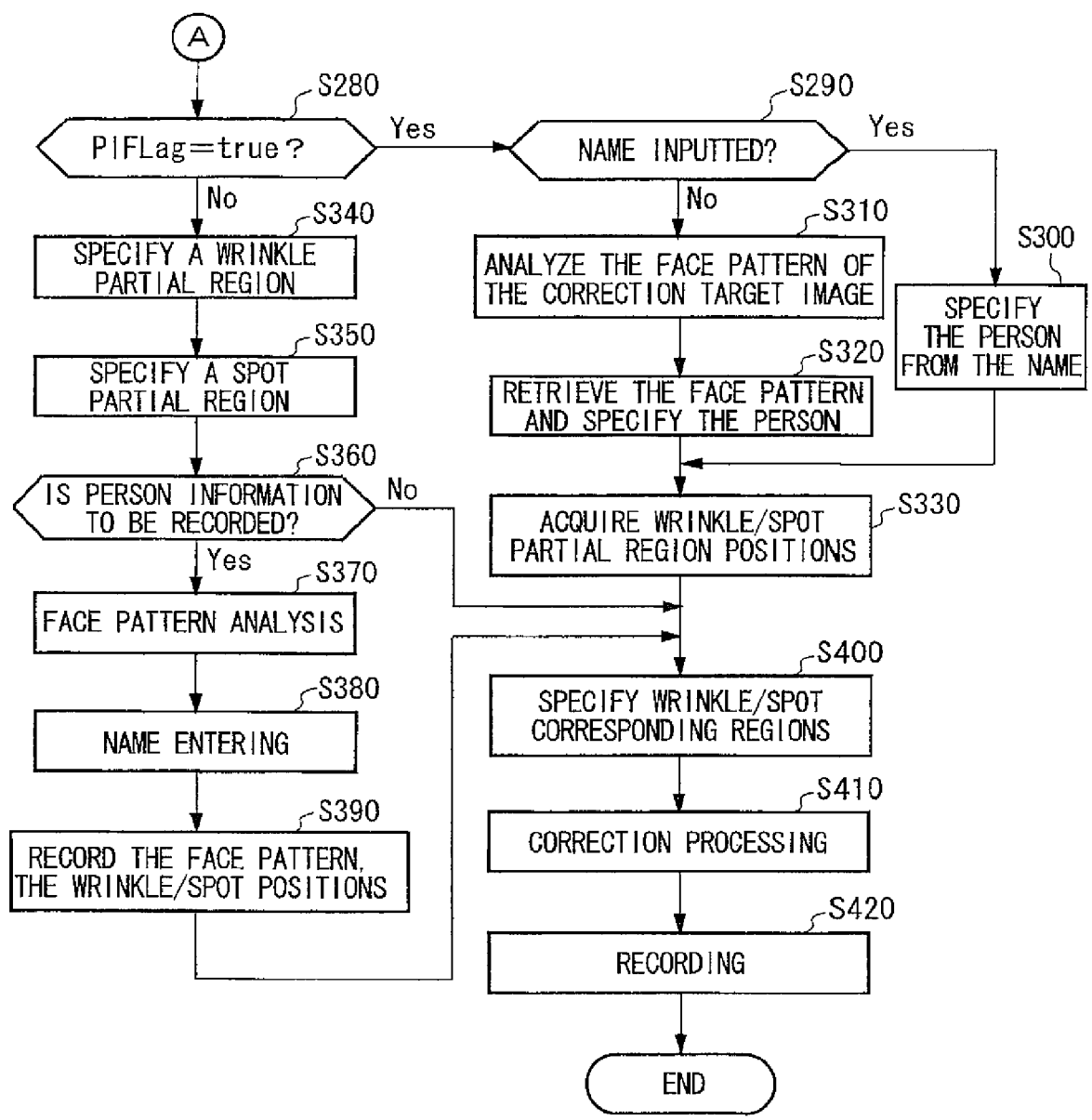
FIG. 4 shows one example of an image capturing method according to the present embodiment.

FIG. 4 shows the last half of the image capturing method according to the present embodiment. After gamma correction is performed in Step S270, it is determined whether the PIFlag is set to be "true" (S280). When the PIFlag is set to be "true", in other words, when person information is to be used, it is then determined whether a name is entered as person identification information (S290). When a name is entered, the person is specified using the name (5300), and the control proceeds to Step S330.

When a name is not entered in Step S290, the face pattern is extracted by analyzing the captured correction target image (S310). The person is specified by searching the face pattern storage section 184 using the extracted face pattern (S320). Note that when specifying of the face pattern is failed, the process may be ended here, or the process may be restarted by returning to Step S240. When the person is specified either in Step 300 or Step S320, the position of the wrinkle partial region and the position of the spot partial region recorded in the partial region position storage section 182 in association with the person are acquired (S330).

In Step S280, when the PIFlag is not set to be "true", in other words, when person information is determined as not to be used, a wrinkle partial region is specified using the wrinkle partial region specifying image (S340). Moreover, a spot partial region is specified using the spot partial region specifying image (S350). Next, it is determined whether to record person information (S360). When person information is to be recorded, the face pattern is analyzed from the correction target image (S370), and the name to be associated with the face pattern is entered as person identification information (S380). Note that the analysis of the face pattern may be performed using the wrinkle partial region specifying image or a spot partial region specifying image.

Next, the position of the wrinkle partial region and the position of the spot partial region, which have been specified in Step S340 and Step S350, and the face pattern analyzed in Step S370 are respectively recorded to the partial region position storage section 182 and the face pattern storage section 184, in association with the name entered in Step S380 (S390). The position of the wrinkle partial region and the position of the spot partial region, as well as the face pattern can be used in using the person information later on.

Next, the wrinkle corresponding region and the spot corresponding region of the correction target image are specified, either from the wrinkle partial region and the spot partial region having been specified in Step S340 and Step S350, or the position of the wrinkle partial region and the position of the spot partial region having been acquired in Step S330 (S400). Correction processing is performed to the wrinkle corresponding region and the spot corresponding region that have been specified (S410), and the image after the correction is recorded to a nonvolatile memory or the like (S420). Thereafter the processing is ended.

When the normal image capturing mode is selected in Step S200, the control proceeds to the normal image capturing mode from Step S430 (S430). In the normal image capturing mode, the received light polarization plate 126 is set to be OFF (S440), and the irradiated light polarization plate 114 is set to be OFF (S450). Thereafter the image capturing is performed (S460). The captured image is recorded to a nonvolatile memory or the like (S470), and the processing is ended.

Figure 5:
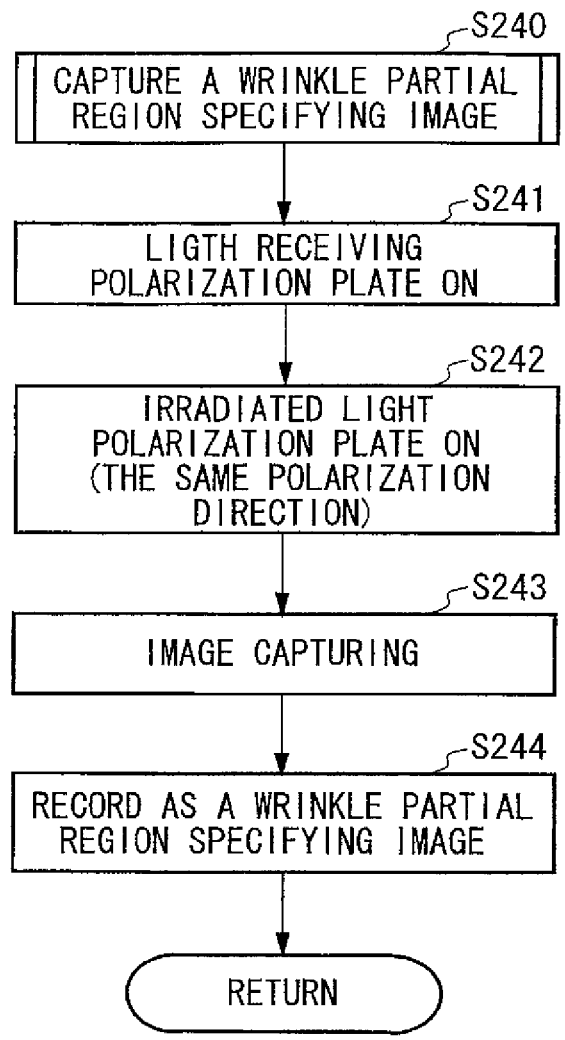
FIG. 5 shows one example of capturing a wrinkle partial region specifying image.

FIG. 5 shows one example of capturing a wrinkle partial region specifying image. In capturing a wrinkle partial region specifying image, firstly the received light polarization plate 126 is set to be ON (S241), and the irradiated light polarization plate 114 is set to be ON (S242). Hereinafter, "ON" indicates to set a corresponding polarization plate on the light path. The polarization direction of the irradiated light polarization plate 114 is set as the same as the polarization direction of the received light polarization plate 126. Thereafter image capturing is performed (S243), and the captured image is recorded as a wrinkle partial region specifying image (S244).

Figure 6:
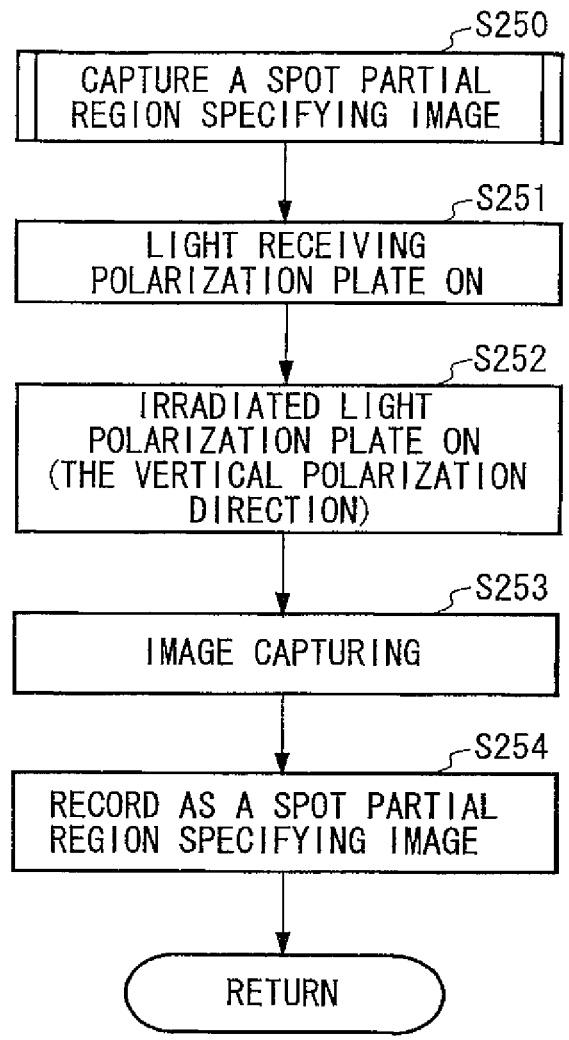
FIG. 6 shows one example of capturing a spot partial region specifying image.

FIG. 6 shows one example of capturing a spot partial region specifying image. In capturing a spot partial region specifying image, the received light polarization plate 126 is set to be ON (S251), and the irradiated light polarization plate 114 is set to be ON (S252). The polarization direction of the irradiated light polarization plate 114 is set to be vertical to the polarization direction of the received light polarization plate 126. Thereafter image capturing is performed (S253), and the captured image is recorded as a spot partial region specifying image (S254).

Figure 7:
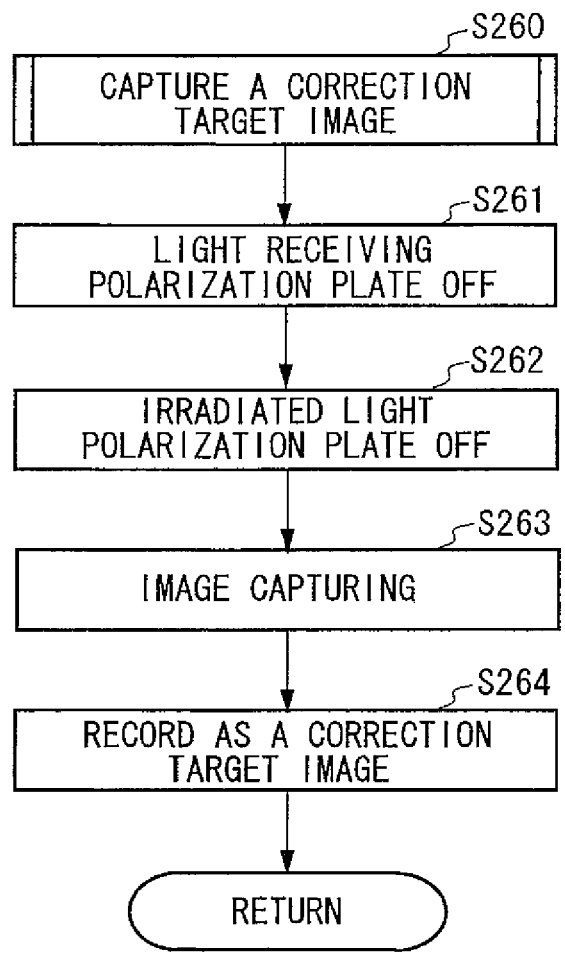
FIG. 7 shows one example of capturing a correction target image.

FIG. 7 shows one example of capturing a correction target image. In capturing a correction target image, the received light polarization plate 126 is set to be OFF (S261), and the irradiated light polarization plate 114 is set to be OFF (S262). Hereinafter, "OFF" indicates to exclude a corresponding polarization plate from the light path. Thereafter image capturing is performed (S263), and the captured image is recorded as a correction target image (S264).

According to the image capturing apparatus 100 described above, it is possible to acquire a wrinkle partial region specifying image in which the subject surface is emphasized, and a spot partial region specifying image in which inside the subject is emphasized, by a combination of polarization plates. Furthermore, the wrinkle partial region and the spot partial region are specified, using the wrinkle partial region specifying image and the spot partial region specifying image, which enables to specify corresponding regions of a correction target image to correct the correction target image so as to render the wrinkle and the spot to look less noticeable. As a result, the person image is able to look more beautiful.

Although some aspects of the present invention have been described by way of exemplary embodiments, it should be understood that those skilled in the art might make many changes and substitutions without departing from the spirit and the scope of the present invention which is defined only by the appended claims.

For example, in the embodiments described above, one light receiving element 124 is used to capture a wrinkle partial region specifying image, a spot partial region specifying image, and a correction target image. However; it is alternatively possible to provide dedicated light receiving elements respectively for a wrinkle partial region specifying image, a spot partial region specifying image, and a correction target image.

Figure 8:
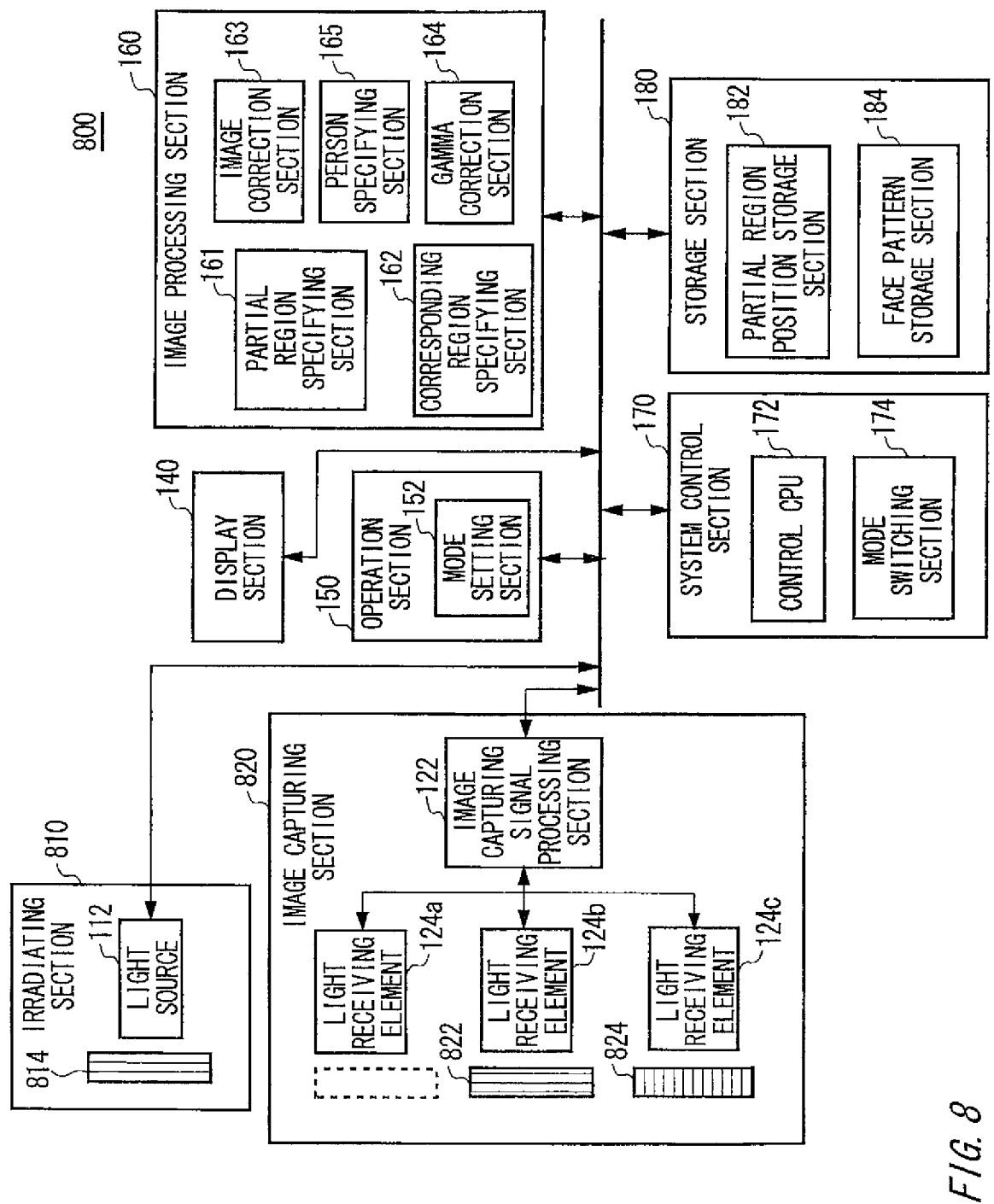
FIG. 8 shows a modification example of the image capturing apparatus 100.

FIG. 8 shows a modification example of the image capturing apparatus 100. In the following description, the members assigned the same reference numerals as in the image capturing apparatus 100 are not described. The image capturing apparatus 800 includes an irradiating section 810 and an image capturing section 820. An irradiated light polarization plate 814 included in the irradiating section 810 may be a fixed polarization plate positioned on the light path of the light source 112. Accordingly, light irradiated from the irradiating section 810 constantly has a fixed polarization direction.

The image capturing section 820 includes a light receiving element 124a, a light receiving element 124b, and a light receiving element 124c. The light receiving element 124a does not have a received light polarization plate on its light path, and so an image captured by the light receiving element 124a will be a correction target image. The light receiving element 124b has, on its light path, a received light polarization plate 822 whose polarization direction is the same as the polarization direction of the irradiated light polarization plate 814 of the irradiating section 810, and so an image captured by the light receiving element 124b will be a wrinkle partial region specifying image. The light receiving element 124c has, on its light path, a received light polarization plate 824 whose polarization direction is vertical to the polarization direction of the irradiated light polarization plate 814 of the irradiating section 810, and so an image captured by the light receiving element 124c will be a spot partial region specifying image.

According to the image capturing apparatus 800, dedicated light receiving elements are respectively provided for a wrinkle partial region specifying image, a spot partial region specifying image, and a correction target image. Therefore, it is not necessary to drive a polarization plate. As a result, the image capturing apparatus can be simplified.

In addition, in the above-described embodiment, a polarization plate having a single transmission region for transmitting light of a predetermined polarization direction is exemplified, as the received light polarization plate 126, the received light polarization plate 822, and the received light polarization plate 824. However, a polarization plate may include a first transmission region for transmitting light of a first polarization direction and a second transmission region for transmitting light of a second polarization direction that is substantially vertical to the first polarization direction. Moreover, the light receiving element corresponding to the polarization plate may include a first light receiving region for receiving light transmitted through the first transmission region and a second light receiving region for receiving light transmitted through the second transmission region.

Figure 9:
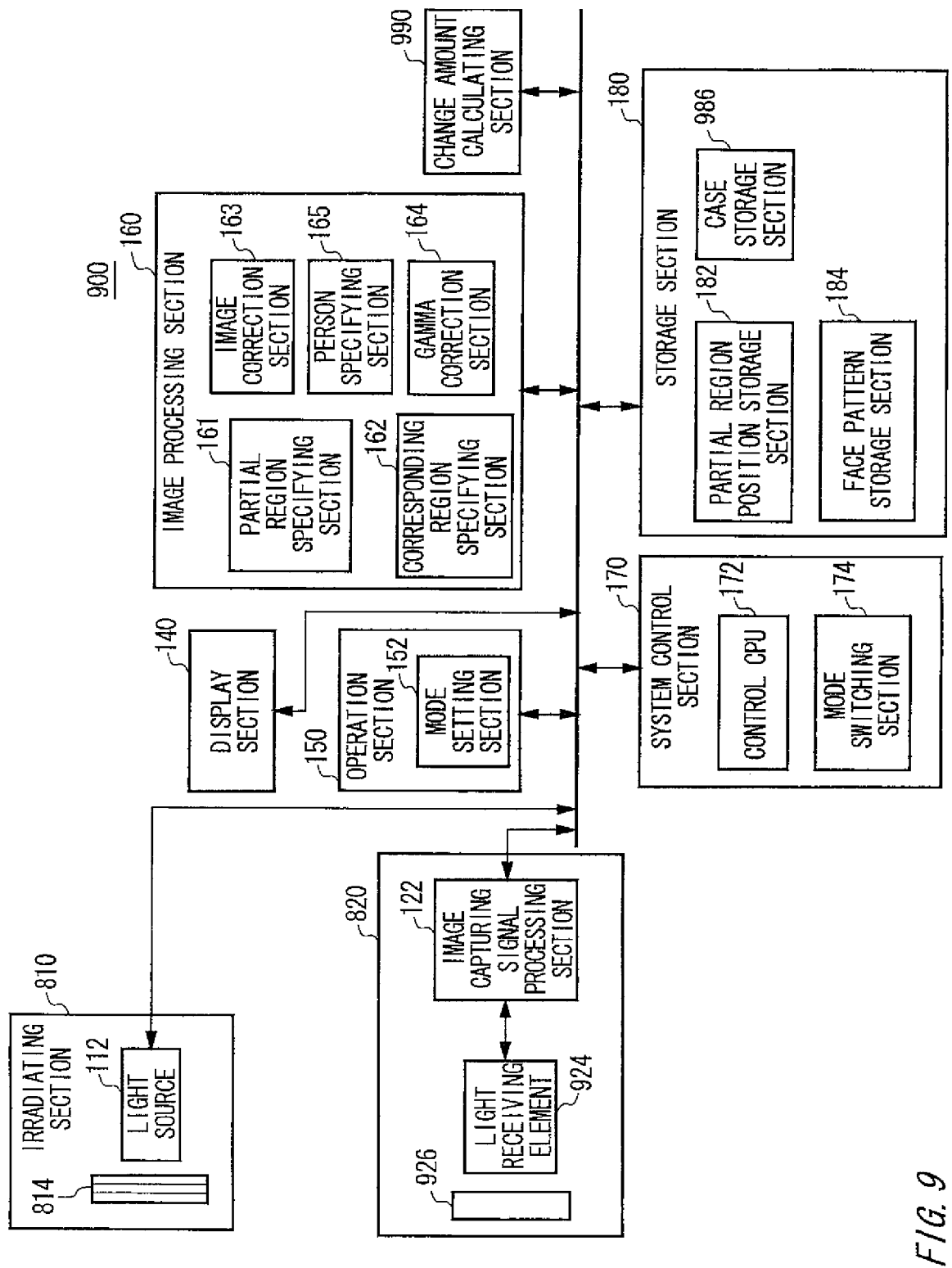
FIG. 9 shows one example of an image capturing apparatus 900 which is a modification example of an image capturing apparatus 800.

FIG. 9 shows one example of an image capturing apparatus 900 which is a modification example of an image capturing apparatus 800. In the following description, the members assigned the same reference numerals as in the image capturing apparatus 800 are not described. An image capturing section 820 included in the image capturing apparatus 900 includes a light receiving element 924 and a received light polarization plate 926.

Figure 10:
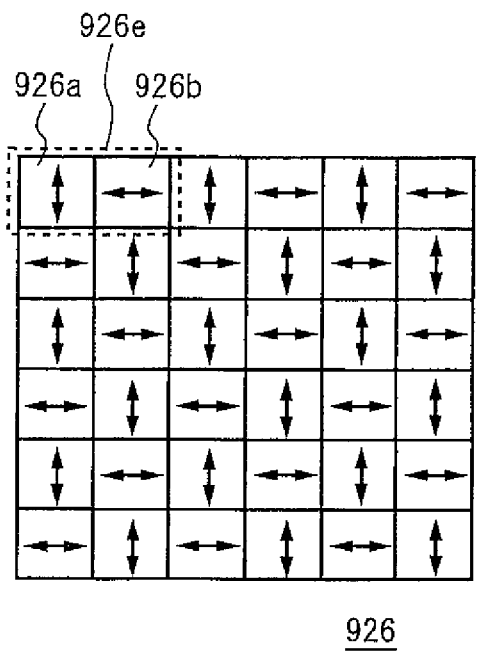
FIG. 10 shows a plan view example of a received light polarization plate 926.

FIG. 10 shows a plan view example of a received light polarization plate 926. The received light polarization plate 926 includes a first transmission region 926a for transmitting light of a first polarization direction and a second transmission region 926b for transmitting light of a second polarization direction that is substantially vertical to the first polarization direction. The first transmission region 926a and the second transmission region 926b constitute one pixel region 926e. A plurality of pixel regions 926e are formed in a two dimensional formation in repetition and correspond to one pixel of a captured image.

In the pixel region 926e, each of the first transmission region 926a and the second transmission region 926b may include each color component region corresponding to each color component. To be more specific, the first transmission region 926a may include color component regions, each of which corresponds to one of the color components of R (red), G (green), and B (blue). Likewise, the second transmission region 926b may include color component regions, each of which corresponds to one of the color components of R (red), G (green), and B (blue).

The light receiving element 924 includes a first light receiving region for receiving light transmitted through the first transmission region 926a and a second light receiving region for receiving light transmitted through the second transmission region 926b. The light receiving element 924 may for example be a CCD (charge coupled device) image sensor, and the first light receiving region and the second light receiving region may be a photo diode provided for the image sensor. When the first transmission region 926a and the second transmission region 926b include a color component region, the first light receiving region and the second light receiving region of the light receiving element 924 also include a light receiving region corresponding to the color component region.

The light receiving element 924 in the image capturing apparatus 900 according to the present embodiment simultaneously performs capturing of a wrinkle partial region specifying image (Step S240), capturing of a spot partial region specifying image (Step S250), and capturing of a correction target image (Step S260), which are explained in FIG. 3. To be more specific, the light receiving element 924 captures a wrinkle partial region specifying image that may be a first image, by means of light from the subject received by the first light receiving region corresponding to the first transmission region 926*a*. The light receiving element 924 captures a spot partial region specifying image that may be a first image, by means of light from the subject received by the second light receiving region corresponding to the second transmission region 926*b*. The light receiving element 924 combines signals according to light from the subject respectively received by the first light receiving region corresponding to the first transmission region 926*a* and the second light receiving region corresponding to the second transmission region 926*b*, to capture a correction target image that may be a second image.

According to the image capturing apparatus 900, a wrinkle partial region specifying image, a spot partial region specifying image, and a correction target image are able to be simultaneously captured by means of a single received light polarization plate 926 and a light receiving element 924, and accordingly the number of parts can be reduced and it is not necessary to drive the irradiated light polarization plate 814. As a result, the image capturing apparatus 900 can be further simplified. Note that the received light polarization plate 926 may be replaced by a received light polarization plate that further includes a third transmission region for transmitting light including light of the first polarization direction and light of the second polarization direction.

Figure 11:
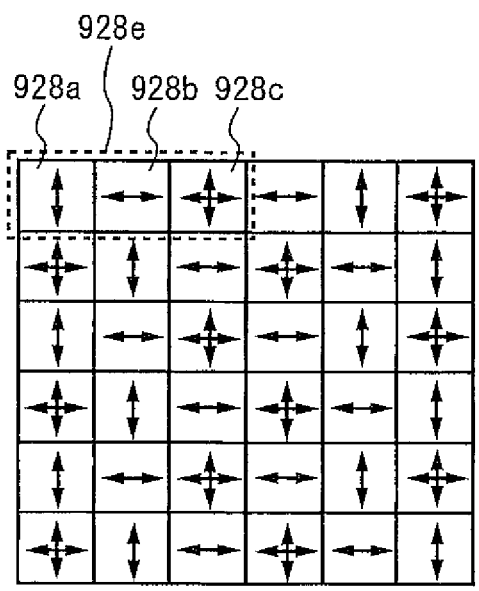
FIG. 11 shows a plan view example of a received light polarization plate 928.

FIG. 11 shows a plan view example of a received light polarization plate 928. The received light polarization plate 928 includes a first transmission region 928*a* for transmitting light of the first polarization direction, a second transmission region 928*b* for transmitting light of the second polarization direction that is substantially vertical to the first polarization direction, and a third transmission region 928*c* for transmitting light of both of the first polarization direction and the second polarization direction. The first transmission region 928*a*, the second transmission region 928*b*, and the third transmission region 928*c* constitute one pixel region 928*e*. A plurality of pixel regions 928*e* are formed in a two dimensional formation and correspond to one pixel of a captured image. A pixel region 928*e* may include a color component region, just as in the case of the received light polarization plate 926.

In the above-described case, the light receiving element 924 may further include a third light receiving region for receiving light transmitted through the third transmission region 928*c*. In the correction image capturing mode, the light receiving element 924 is able to capture a correction target image that may be a second image, by means of light received by the third light receiving region corresponding to the third transmission region 928*c*.

The above-described image capturing apparatus may include a change amount calculating section that calculates, from images before/after treatment that include a treatment region to be treated, a brightness change amount or a chromaticity change amount in the images before/after the treatment within the treatment region. The above-described image capturing apparatus may further include a case storage section that stores the brightness change amount or the chromaticity change amount calculated by the change amount calculating section in association with an index indicating a successful case or a failed case. FIG. 9 shows an example where the image capturing apparatus 900 includes a change amount calculating section 990 and a case storage section 986.

The change amount calculating section 990 calculates, from images before/after treatment that include a treatment region to be treated, a brightness change amount or a chromaticity change amount in the images before/after treatment within the treatment region. The case storage section 986 stores the brightness change amount or the chromaticity change amount calculated by the change amount calculating section 990 in association with an index indicating a successful case or a failed case. In correcting a correction target image being one example of the second image as a predicted image of a successful case, the image correction section 163 performs image processing to a correction target image so that the brightness or the chromaticity in the corresponding region changes by the brightness change amount or the chromaticity change amount stored in the case storage section 986 in association with the index indicating a successful case. In correcting a correction target image as a predicted image of a failed case, the image correction section 163 performs image processing to a correction target image so that the brightness or the chromaticity in the corresponding region changes by the brightness change amount or the chromaticity change amount stored in the case storage section 986 in association with the index indicating a failed case. The display section 140 displays the correction target image (i.e. the second image) after correction by the image correction section 163, as a predicted image of either a successful case or a failed case.

According to the image capturing apparatus 900 that includes the change amount calculating section 990 and the case storage section 986, it is possible to confirm, prior to skin treatment, both of the skin state in the case of success of the treatment and the skin state in the case of failure of the treatment. Note that the image capturing apparatus 900 that includes the change amount calculating section 990 and the case storage section 986, when applied to the skin diagnosis, can also be interpreted as a skin diagnosis method. The skin diagnosis method may further include: a step of calculating a brightness change amount or a chromaticity change amount for images of a corresponding region before/after skin treatment by means of the change amount calculating section 990; and a step of storing, in the case storage section 986, the calculated brightness change amount or chromaticity change amount in association with an index indicating a successful case or a failed case.

In the above embodiment, the image capturing apparatus is shown as one example of an image correction apparatus according to the innovations herein. However, the image correction apparatus according to the innovations herein (particularly the image processing section 160, the system control section 170, and the storage section 180 in the image capturing apparatus 100) may be constituted by an electronic information processing apparatus such as a personal computer or a server connected by a network.

Figure 12:
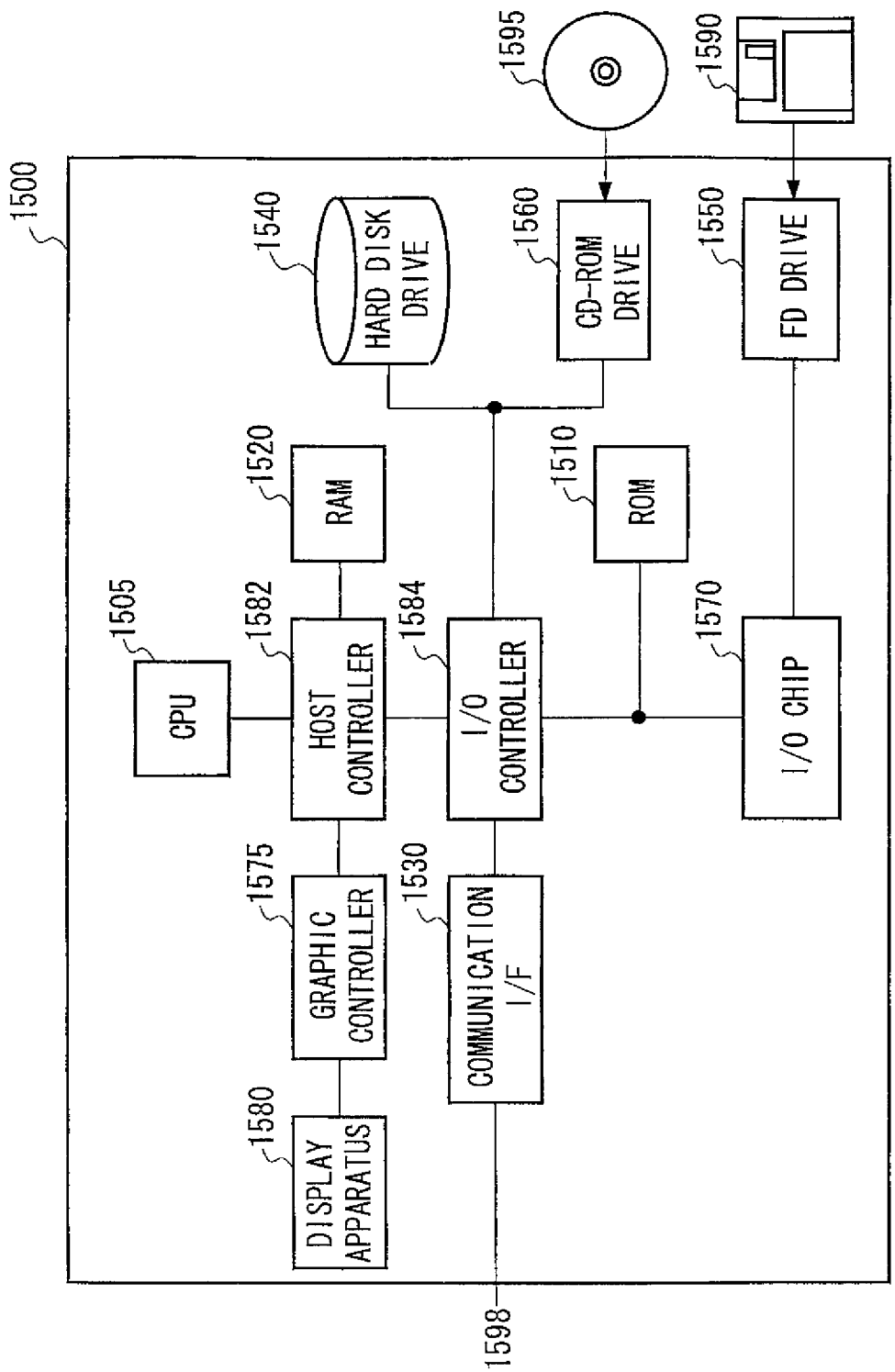
FIG. 12 shows one example of a hardware configuration when the image correction apparatus according to the innovations herein is configured by an electronic information processing apparatus such as a personal computer.

FIG. 12 shows one example of a hardware configuration in the case of constituting the image correction apparatus according to the innovations herein by an electronic information processing apparatus 1500 such as a personal computer. The image correction apparatus is provided with a CPU peripheral section that includes a CPU 1505, a RAM 1520, a graphic controller 1575, and a display apparatus 1580 connected to each other by a host controller 1582; an input/output section that includes a communication interface 1530, a hard disk drive 1540, and a CD-ROM drive 1560, all of which are connected to the host controller 1582 by an input/output controller 1584; and a legacy input/output section that includes a ROM 1510, a flexible disk drive 1550, and a input/output chip 1570, all of which are connected to the input/output controller 1584.

The host controller 1582 is connected to the RAM 1520 and is also connected to the CPU 1505 and the graphic controller 1575 accessing the RAM 1520 at a high transfer rate. The CPU 1505 operates to control each section based on programs stored in the ROM 1510 and the RAM 1520. The graphic controller 1575 obtains image data generated by the CPU 1505 or the like on a frame buffer disposed inside the RAM 1520 and displays the image data in the display apparatus 1580. Alternatively, the graphic controller 1575 may internally include the frame buffer storing the image data generated by the CPU 1505 or the like.

The input/output controller 1584 connects the hard disk drive 1540 serving as a relatively high speed input/output apparatus, the communication interface 1530, and the CD-ROM drive 1560 to the host controller 1582. The hard disk drive 1540 stores the programs and data used by the CPU 1505. The communication interface 1530 transmits and receives programs and data by connecting to a network communication apparatus 1598. The CD-ROM drive 1560 reads the programs and data from a CD-ROM 1595 and provides the read information to the communication interface 1530 and to the hard disk drive 1540 via the RAM 1520.

Furthermore, the input/output controller 1584 is connected to the ROM 1510, and is also connected to the flexible disk drive 1550 and the input/output chip 1570 serving as a relatively high speed input/output apparatus. The ROM 1510 stores a boot program performed when the image correction apparatus starts up, a program relying on the hardware of the image correction apparatus, and the like. The flexible disk drive 1550 reads programs or data from a flexible disk 1590 and supplies the read programs or data to the communication interface 1530 and the hard disk drive 1540 via the RAM 1520. The input/output chip 1570 connects the flexible disk drive 1550 to a variety of input/output apparatuses via, for example, a parallel port, a serial port, a keyboard port, a mouse port, or the like.

A program executed by the CPU 1505 is provided by a user in a state where it is stored in a storage medium, such as the flexible disk 1590, the CD-ROM 1595, or an IC card. The program stored in the storage medium may be compressed or not be compressed. The program is installed from the storage medium to the hard disk drive 1540, and is read by the RAM 1520 to be executed by the CPU 1505. The program executed by the CPU 1505 causes to function as the image processing section 160, the system control section 170, and the storage section 180, described above in relation to FIG. 1 through FIG. 11.

The programs shown above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to a dedicated communication network or the Internet may be used as the storage medium to provide the image correction apparatus as a program via the network.

The innovations herein relate to an image capturing apparatus and an image correction technology usable in an image capturing apparatus. Accordingly, the innovations herein are usable in an image capturing apparatus industry and an industry that makes use of an image correction technology.

What is claimed is:

1. An image correction apparatus comprising:
an irradiating section that irradiates, to a subject, light of a predetermined polarization direction;
an image capturing section that captures
a first image of the subject under a first image capturing condition and
a second image of the subject under a second image capturing condition that is different from the first image capturing condition,
wherein said image capturing section comprises:
a polarizer that transmits the light of said predetermined polarization direction, and
a light receiving element that:
captures the first image under the first image capturing condition, by receiving light from the subject via the polarizer which transmits light of said predetermined polarization direction, and
captures the second image under the second image capturing condition, by receiving light from the subject without using the polarizer;
a partial region specifying section that specifies, within the first image, a partial region of the subject's skin that satisfies a predetermined condition;
a corresponding region specifying section that specifies, within the second image, a corresponding region that corresponds to the partial region of the subject's skin in the first image; and
an image correction section that corrects the second image captured by the image capturing section by performing predetermined image processing to the corresponding region specified in the second image.

2. The image correction apparatus as set forth in claim 1, further comprising:
a mode setting section that switches between a skin measuring mode for causing the image capturing section to capture the first image under the first image capturing condition and a correction image capturing mode for causing the image capturing section to capture the second image under the second image capturing condition.

3. The image correction apparatus as set forth in claim 2, wherein
the polarizer is a polarization plate that transmits light of a predetermined polarization direction which is a the first polarization direction, and
the light receiving element captures the first image in the skin measuring mode, and captures the second image in the correction image capturing mode.

4. The image correction apparatus as set forth in claim 3, wherein
the irradiating section irradiates light of the first polarization direction to the subject, and
the partial region specifying section specifies, within the first image, the partial region of the skin whose surface satisfies a predetermined condition.

5. The image correction apparatus as set forth in claim 4, wherein
the light receiving element captures the first image under the first image capturing condition by receiving light having polarization that is substantially parallel to the first polarization direction via the polarization plate, the partial region specifying section specifies the partial region in which a wrinkle exists, within the first image, and the image correction section performs image processing for correcting a wrinkle, to the corresponding region in the second image.

6. The image correction apparatus as set forth in claim 3, wherein the polarizer transmits the light of the first polarization direction, or the light of another predetermined polarization direction which is a second polarization direction that is different from the first polarization direction, and the irradiating section irradiates, to the subject, light of the second polarization direction that is substantially vertical to the first polarization direction, and the partial region specifying section specifies, within the first image, the partial region of the skin whose inside satisfies a predetermined condition.

7. The image correction apparatus as set forth in claim 6, wherein the light receiving element captures the first image under the first image capturing condition by receiving light having polarization that is substantially vertical to the second polarization direction via the polarization plate, the partial region specifying section specifies the partial region in which a spot exists, within the first image, and the image correction section performs image processing for correcting a spot, to the corresponding region in the second image.

8. The image correction apparatus as set forth in claim 2, further comprising:

a gamma correction section that performs gamma correction to the first image captured by the image capturing section by using a first gamma curve, and performs gamma correction to the second image captured by the image capturing section by using a second gamma curve that is different from the first gamma curve, wherein the partial region specifying section analyzes the first image to which gamma correction has been performed by using the first gamma curve, thereby specifying the partial region within the first image.

9. The image correction apparatus as set forth in claim 8, wherein within a skin brightness range within the first image captured by the image capturing section, a gradient of the first gamma curve is larger than a gradient of the second gamma curve.

10. The image correction apparatus as set forth in claim 1, further comprising:

a partial region position storage section that stores a position of the partial region of a person, in association with person identification information for identifying the person; and a person specifying section that specifies the person, when included in the second image, based on the stored person identification information for identifying the person and the stored partial region position of the person, wherein the corresponding region specifying section specifies the corresponding region corresponding to the partial region within the second image, based on the position of the partial region stored in the partial region position storage section in association with the person identification information for identifying the person specified by the person specifying section.

11. The image correction apparatus as set forth in claim 1, further comprising:

a change amount calculating section that calculates, from images before/after treatment that include a treatment region to be treated, a brightness change amount or a chromaticity change amount in the images before/after the treatment within the treatment region;

a case storage section that stores the brightness change amount or the chromaticity change amount calculated by the change amount calculating section in association with an index indicating a successful case or a failed case; and a display section that displays the second image after correction by the image correction section, as a predicted image of either a successful case or a failed case, wherein in correcting the second image as the predicted image of the successful case, the image correction section performs image processing to the second image so that the brightness or the chromaticity of the corresponding region changes by the brightness change amount or the chromaticity change amount stored in the case storage section in association with the index indicating the successful case, and in correcting the second image as the predicted image of the failed case, the image correction section performs image processing to the second image so that the brightness or the chromaticity of the corresponding region changes by the brightness change amount or the chromaticity change amount stored in the case storage section in association with the index indicating the failed case.

12. An image correction apparatus comprising:

a partial region specifying section that specifies a partial region of a skin that satisfies a predetermined condition, within a first image captured under a first image capturing condition;

a corresponding region specifying section that specifies a corresponding region that corresponds to the partial region, within a second image captured under a second image capturing condition;

an image correction section that corrects the second image by performing predetermined image processing to the corresponding region of the second image;

an image capturing section that captures the first image and the second image; and a mode setting section that switches between a skin measuring mode for causing the image capturing section to capture the first image under the first image capturing condition and a correction image capturing mode for causing the image capturing section to capture the second image under the second image capturing condition, wherein the image capturing section includes:

a polarization plate that includes a first transmission region for transmitting light of a first polarization direction and a second transmission region for transmitting light of a second polarization direction that is substantially vertical to the first polarization direction; and a light receiving element that includes a first light receiving region for receiving light transmitted through the first transmission region and a second light receiving region for receiving light transmitted through the second transmission region, wherein the light receiving element captures the first image by means of light from a subject having been received either by the first light receiving region or the second light receiving region, in the skin measuring mode.

13. The image correction apparatus as set forth in claim 12, wherein
the light receiving element captures the second image, by combining a signal according to light received by the first light receiving region and a signal according to light received by the second light receiving region, in the correction image capturing mode.

14. The image correction apparatus as set forth in claim 12, wherein
the polarization plate further includes a third transmission region for transmitting light including light of the first polarization direction and light of the second polarization direction, and
the light receiving element further includes a third light receiving region for receiving light transmitted through the third transmission region, and captures the second image by means of light received by the third light receiving region in the correction image capturing mode.

15. An image correction method comprising:
irradiating, to a subject, light of a predetermined first polarization direction;
capturing a first image of the subject under a first image capturing condition, and a second image of the subject under a second image capturing condition that is different from the first image capturing condition,
wherein said capturing is performed using
a polarizer that transmits the light of said predetermined polarization direction, and
a light receiving element that
captures the first image under the first image capturing condition, by receiving light from the subject via the polarizer which transmits light of said predetermined polarization direction, and
captures the second image under the second image capturing condition, by receiving light from the subject without using the polarizer;
specifying, within the first image, a partial region of the subject's skin that satisfies a predetermined condition;
specifying, within the second image, a corresponding region that corresponds to the partial region of the subject's skin in the first image; and
correcting the second image captured under the second image capturing condition by performing predetermined image processing to the corresponding region specified in the second image.

16. The image correction method as set forth in claim 15, further comprising:
reading a brightness change amount or a chromaticity change amount in images before/after treatment in a treatment region to be treated, which is calculated from the images before/after the treatment that include the treatment region, from a case storage section that stores the brightness change amount or the chromaticity change amount in association with an index indicating a successful case or a failed case, wherein
in correcting the second image as the predicted image of the successful case, the predetermined image processing performed to the corresponding region of the second image is performed so that the brightness or the chromaticity of the corresponding region changes by the brightness change amount or the chromaticity change amount stored in the case storage section in association with the index indicating the successful case, and in correcting the second image as the predicted image of the failed case, the predetermined image processing performed to the corresponding region of the second image is performed so that the brightness or the chromaticity of the corresponding region changes by the brightness change amount or the chromaticity change amount stored in the case storage section in association with the index indicating the failed case, and
the second image having been corrected in the image correction after image processing is displayed as a predicted image of either the successful case or the failed case, the image correction method being used as part of skin diagnosis.

17. A skin diagnosis method as set forth in claim 16, further comprising:
calculating the brightness change amount or the chromaticity change amount of the image of the corresponding region before/after skin treatment; and
storing the calculated brightness change amount or chromaticity change amount in the case storage section in association with an index indicating a successful case or a failed case.

18. A non-transitory computer readable medium having recorded thereon computer instructions enabling a computer executing the computer instructions to cause an image correction apparatus, to function as:
an irradiating section that irradiates, to a subject, light of a predetermined first polarization direction;
an image capturing section that captures
a first image of the subject under a first image capturing condition and
a second image of the subject under a second image capturing condition that is different from the first image capturing condition,
wherein said image capturing section comprises:
a polarizer that transmits the light of said predetermined polarization direction, and
a light receiving element that:
captures the first image under the first image capturing condition, by receiving light from the subject via the polarizer which transmits light of said predetermined polarization direction, and
captures the second image under the second image capturing condition, by receiving light from the subject without using the polarizer;
a partial region specifying section that specifies, within the first image, a partial region of the subject's skin that satisfies a predetermined condition;
a corresponding region specifying section that specifies, within the second image, a corresponding region that corresponds to the partial region of the subject's skin in the first image; and
an image correction section that corrects the second image captured by the image capturing section by performing predetermined image processing to the corresponding region specified in the second image.

* * * * *